June 27, 1967   A. J. SON ETAL   3,327,354
INJECTION MOLDING MACHINE
Original Filed Aug. 21, 1963   6 Sheets-Sheet 1
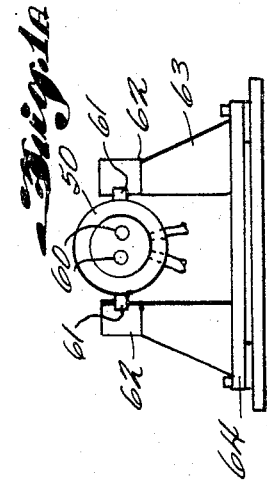
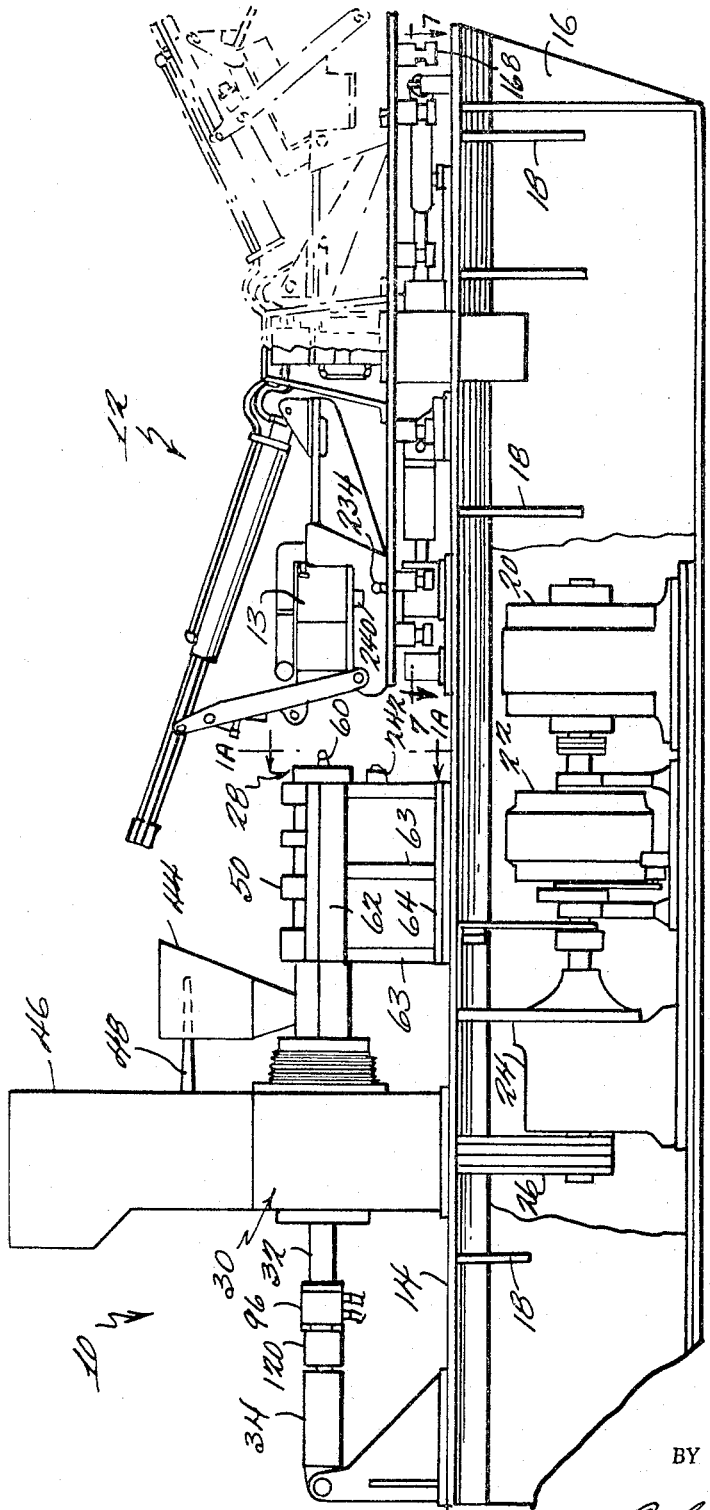
INVENTORS
ANGELO J. SON
BY JOHN J. DELANEY
Cushman, Darby & Cushman
ATTORNEYS

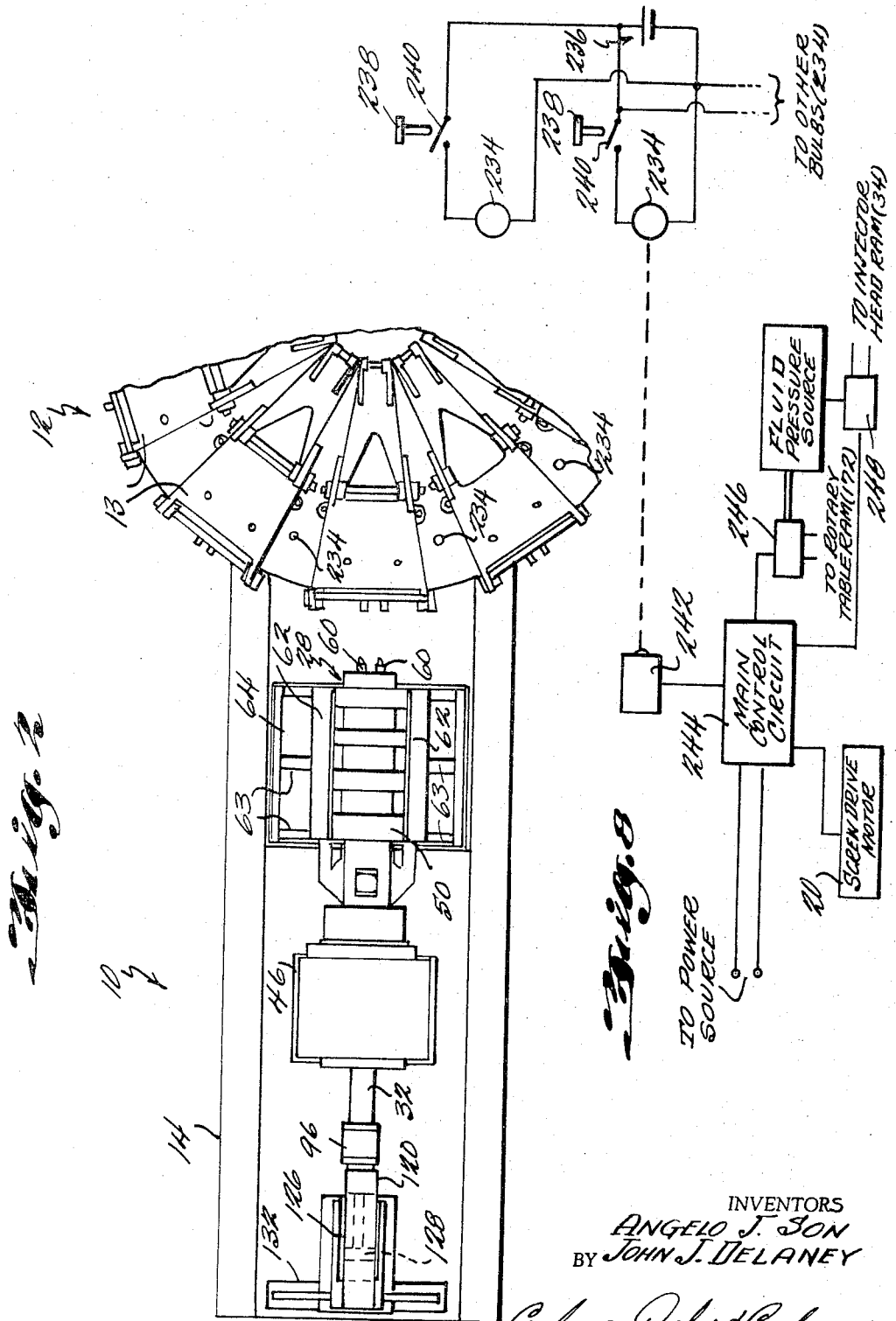

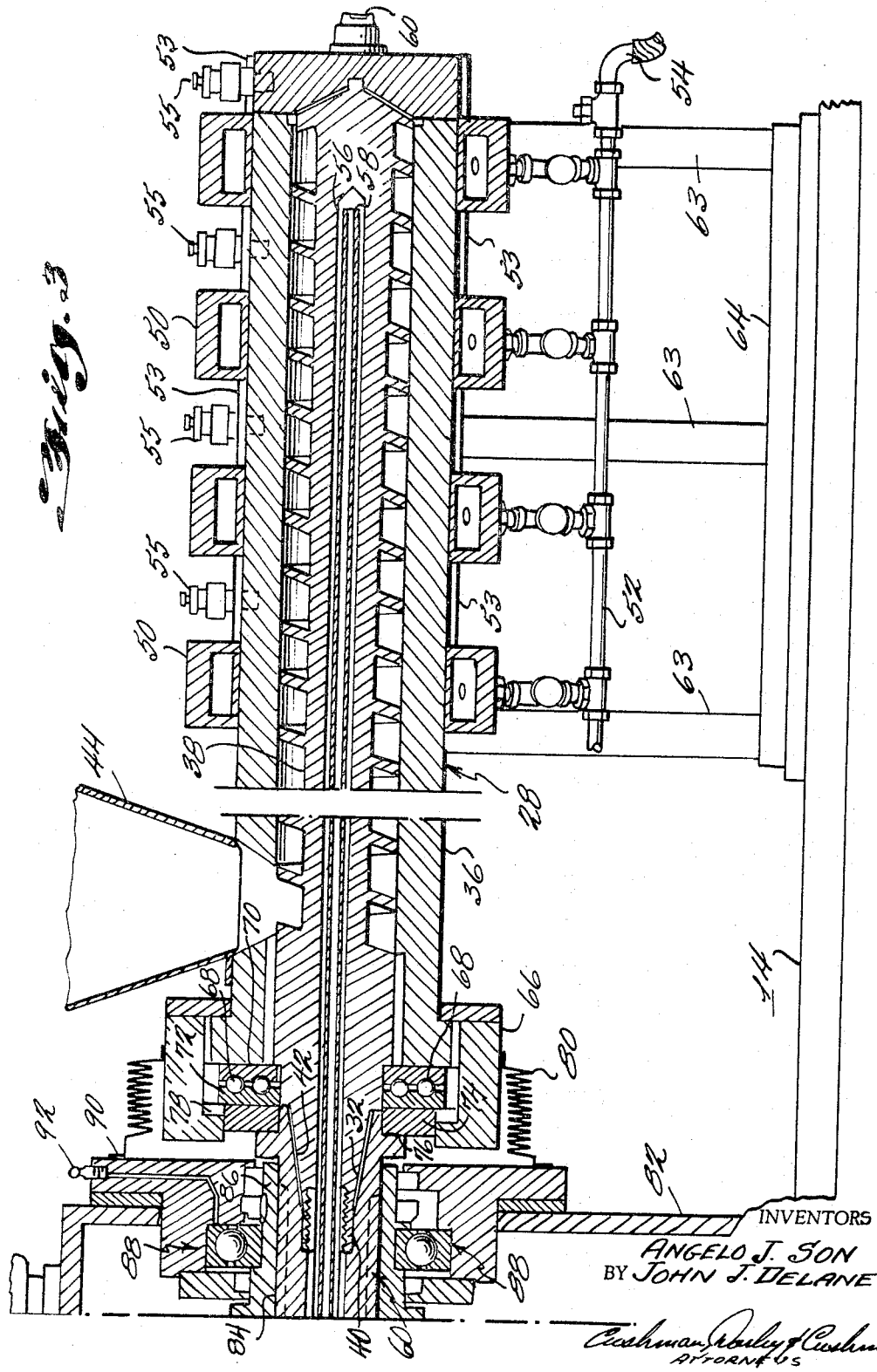

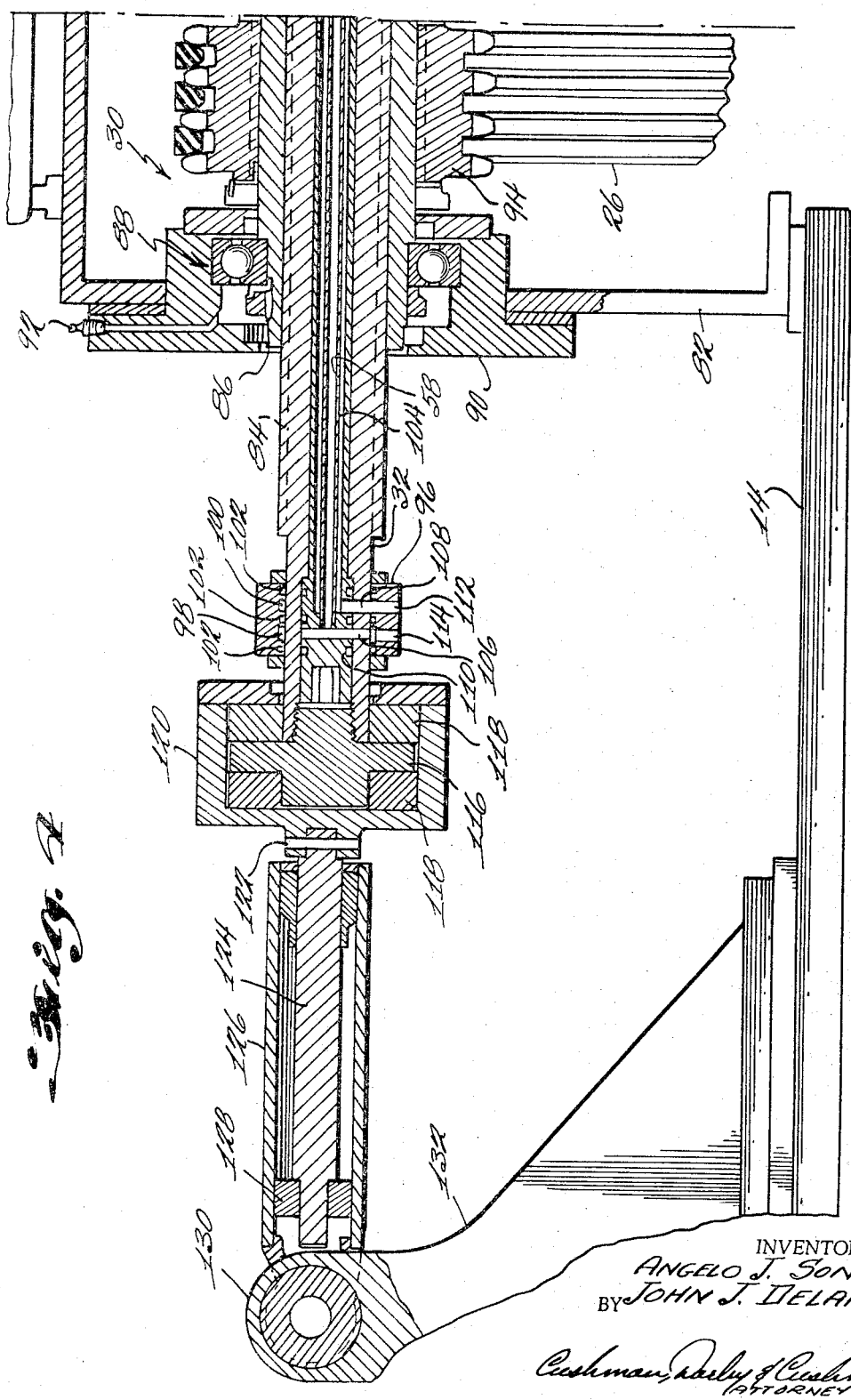

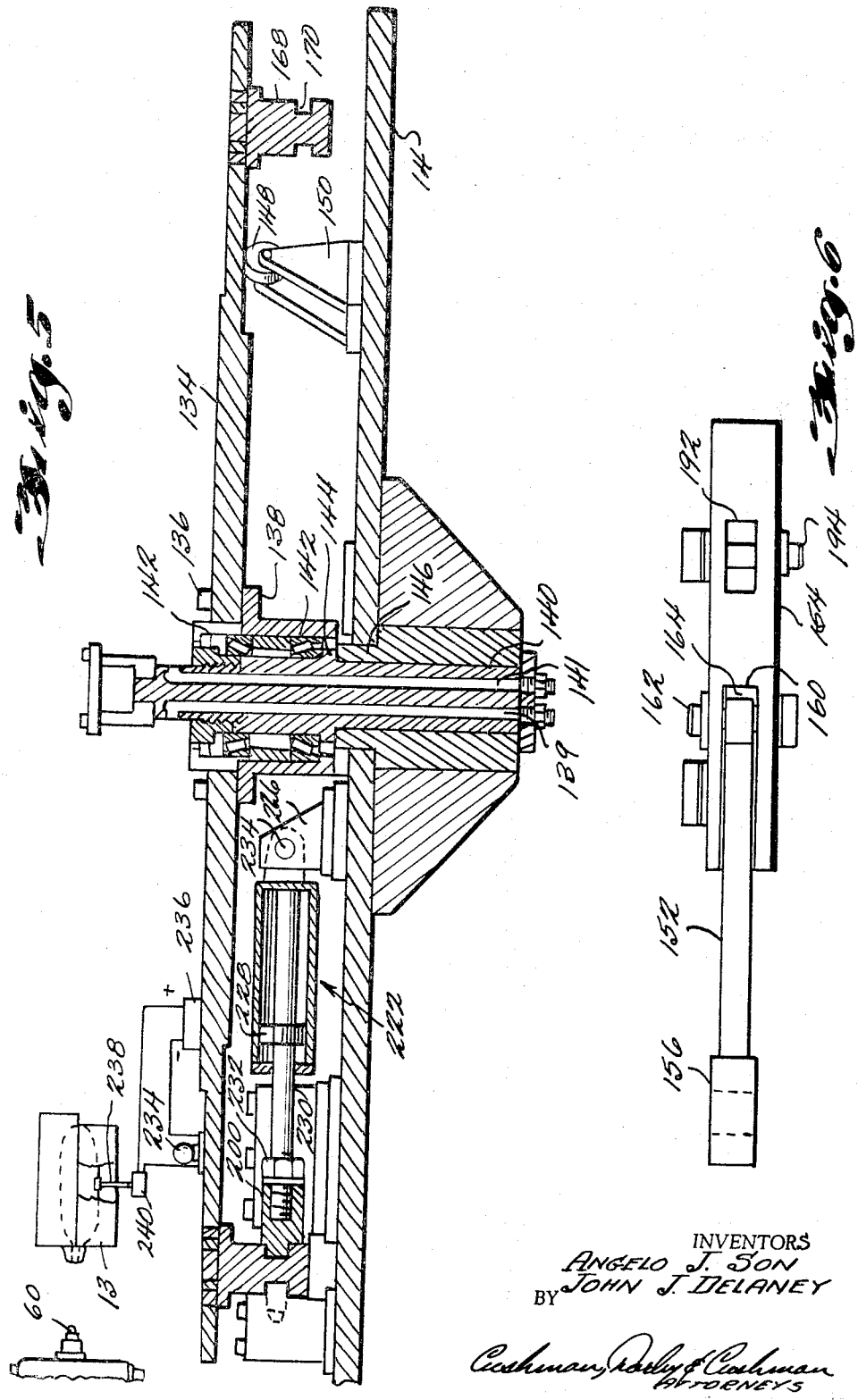

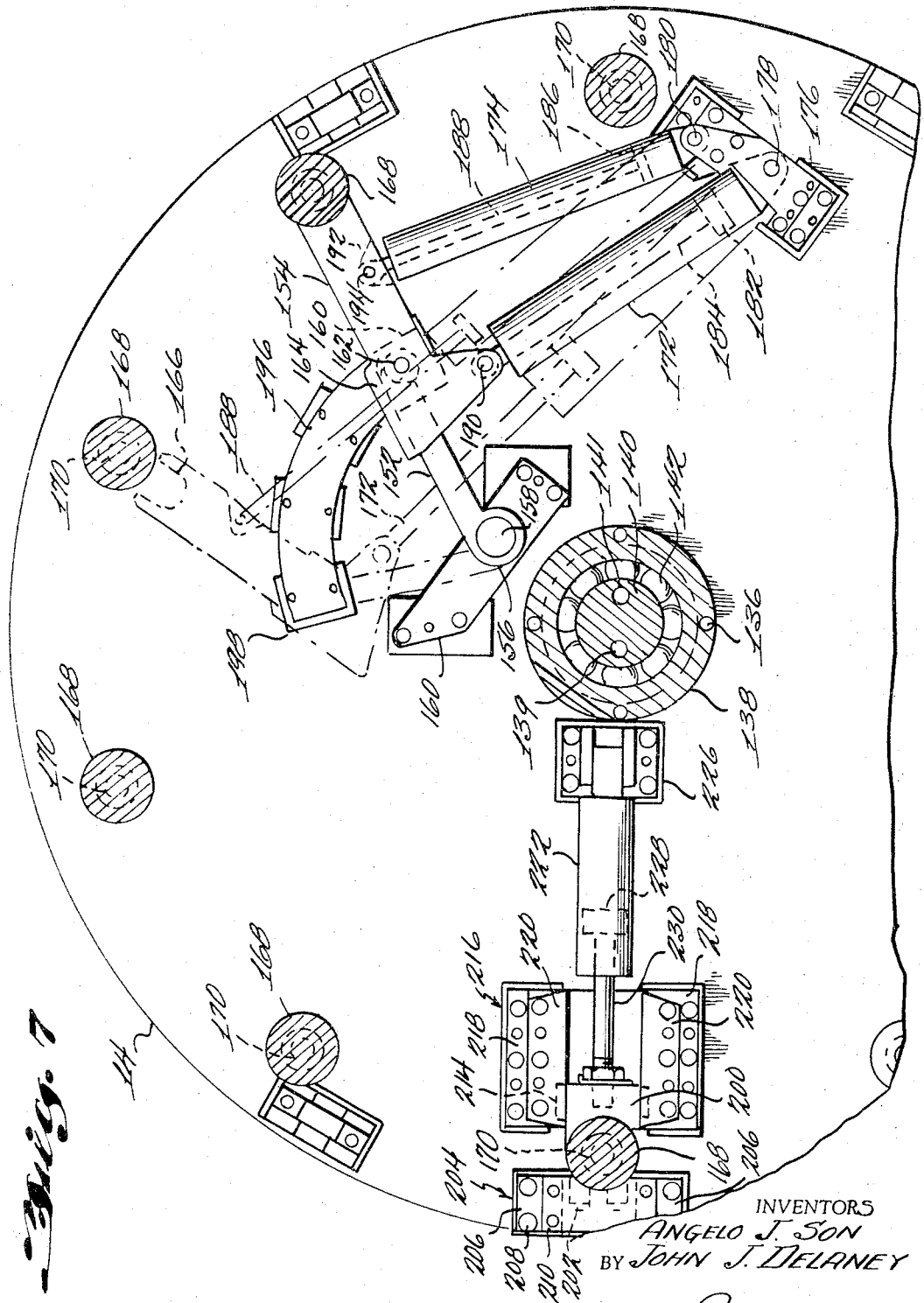

United States Patent Office 3,327,354
Patented June 27, 1967

3,327,354
INJECTION MOLDING MACHINE
Angelo J. Son, Dallas, and John J. Delaney, West Pittston, Pa., assignors to Medico Industries, Inc., Pittston, Pa., a corporation of Pennsylvania
Original application Aug. 21, 1963, Ser. No. 303,484. Divided and this application Sept. 20, 1966, Ser. No. 580,671
7 Claims. (Cl. 18—30)

ABSTRACT OF THE DISCLOSURE

A molding machine including a linearly movable injection head and a rotatable table carrying a plurality of molds. The injection head includes an internal feed screw which is rotated by a stationary motor through a spline connection. The entire injection head is moved into and out of contact with a mold by a hydraulic ram connected to the shaft of the feed screw. The mold table is rotated in increments by an articulated indexing arm pivoted at the center of the table and moved sequentially into engagement with projections on the table by means of a pair of hydraulic rams. Control means responsive to the filling of a mold actuates the indexing rams and the injection head ram.

---

This application is a division of application, Ser. No. 303,484, filed Aug. 21, 1963.

This invention relates to plastic molding machines of the type having a plurality of molds, an injection head for injecting plastic into one of the molds and means for effecting sequential alignment and engagement between the injection head and the molds for filling the same with plastic. More in particular, the invention relates to improvements in the construction of the elements which effect the alignment and engagement between the molds and the injection head.

It is a primary object of the present invention to provide a rotary mold-supporting table for a molding machine which has an improved positive-acting intermittent drive for accurately aligning each mold with the injection head of the molding machine.

It is a further object of the invention to provide a rotary mold-supporting table having an intermittent rotary drive which is simple and rugged in construction yet which accurately aligns each mold with the injection head of the molding machine and which positively locks the table against movement which would misalign a mold and the injection head.

It is a further object to provide a rotary mold-supporting table of the above type with a hydraulically rotated mechanical linkage which is pivoted at one end and which is adapted at its free end to releasably engage an indexing element for rotating the same through a predetermined arc.

It is a still further object of the invention to provide a molding machine of the type having an injection head and a rotary mold-supporting table in which the table and molds are fixed against linear movement and the injection head is provided with means for moving the same linearly into engagement with a mold.

It is another object to provide a molding machine of the above type having a connection between the injection head and the motor for operating the same which permits the injection head to be moved linearly while the motor remains fixed.

It is another object to provide a molding machine of the type having an injection head and a movable mold-supporting table in which a self-contained signal-generating means requiring no electrical connections is mounted on the table for generating a signal in response to the filling of a mold and in which a signal detector is spaced from the table for receiving the signal and for activating a control circuit for the machine.

Broadly, the molding machine of the present invention comprises an injection head which is slidably mounted for linear movement toward and away from a rotatable mold-supporting table which is fixed against linear movement. A screw within the injection head is rotated through a spline or similar connection by a fixed motor for forcing plastic out of an axial discharge opening into a mold with which the injection head is in engagement. Linear movement of the head to effect engagement with a mold is provided by means of an extensible ram connected in axial relation to a bearing which supports the rear end of the drive shaft for the injection screw.

Intermittent rotation of the table to sequentially align the molds with the injection head is provided by means of a mechanical linkage which is pivoted at one end to a fixed support and which is adapted at its other end to releasably engage any of a plurality of indexing pins extending at a right angle from the table, each pin corresponding to one of the molds.

The linkage consists of two links pivoted to each other near their ends and a hydraulically operated ram pivoted at one end to the fixed support and at its other end to the link which is engageable with the index pins. A piston and cylinder dash pot is pivoted at one end to the fixed support and at its other end to the same link outwardly of the point of attachment of the ram. Upon extension of the ram the linkage buckles and rotates about the point at which the inner link is pivoted. Upon contraction of the ram the dash pot initially resists movement of the outer link with the result that the linkage straightens and then rotates in the opposite direction about the pivot point of the inner link. When the linkage straightens, its outer end engages one of the index pins so that rotation of the linkage effects rotation of the table. Upon the next extension of the ram the linkage disengages from the pin and rotates to a position at which it will engage another pin upon contraction of the ram.

The control system of the molding machine includes a self-contained light source mounted on the table and actuated by the filling of its respective mold with plastic. Conveniently, this is accomplished with a battery as a source of current, a bulb corresponding to each mold and a switch actuated by a pin which is extensible from each mold upon the filling thereof. A light detector, such as a photoelectric cell, is mounted either on the injection head or on a fixed support and is connected into a control circuit in such a manner as to initiate proper sequential operation of the injection head screw and the rams.

The invention will be further understood from the following description taken with the drawings in which:

FIGURE 1 is a side elevational view of a molding machine embodying the principles of the present invention;

FIGURE 1A is a front elevational view looking in the direction of the arrows 1A—1A of FIGURE 1;

FIGURE 2 is a top plan view of the machine;

FIGURES 3 and 4 are side elevational views on an enlarged scale of the front and rear ends, respectively, of the injection head of the machine;

FIGURE 5 is an elevational sectional view of the mold-supporting table with some parts omitted;

FIGURE 6 is a fragmentary side view of part of the table indexing mechanism;

FIGURE 7 is a top plan view of the table indexing mechanism looking in the direction of the arrows 7—7 of FIGURE 1; and FIGURE 8 is a diagram of the important elements of the control circuit for the machine.

Referring to FIGURES 1 and 2 there is shown therein an injection molding machine which includes a plastic injection portion 10 and a rotary table portion 12 supporting a plurality of circumferentially spaced molds 13 thereon. A horizontal base frame, indicated generally at 14, is supported in spaced relation from the floor by a suitable housing 16 which, as shown, has exterior vertical reinforcing plates 18 thereon. The housing 16 and base frame 14 serve to support both the injection portion 10 and the rotary table portion 12 and to house the drive for the injection screw. As shown, the drive includes an electric motor 20, an eddy current clutch 22 of controlled output r.p.m., a gear reduction unit 24 and a drive sprocket which drives a chain 26 for rotating the drive shaft of the injection head.

The injection portion 10 includes, as basic parts, an elongated injection head 28 which is slidably mounted with respect to the base frame 14 for movement toward and away from the table portion 12, a splined drive connection 30 fixed to the base frame 14 for rotating an injection drive shaft 32 which is also linearly movable with the injection head 28 and an extensible ram 34 connected to the rear end of the drive shaft 32 for moving the same and the injection head 28 linearly.

Referring to FIGURE 3, the injection head 28 is shown as including a horizontal cylinder 36 within which rotates a gradually diminishing capacity feed screw 38 threadedly connected to the drive shaft 32 at 40 and sealed thereto by a sealing ring 42. A secondary feed hopper 44 is mounted on top of the rear end of the cylinder 36 and communicates with the interior thereof. A primary feed hopper 46 (FIGURES 1 and 2) is mounted on top of a housing for the splined connection 30 and has a chute 48 fixed thereto which delivers the material to be molded into the secondary hopper 44. Any suitable feed device (not shown) may be provided for conveying material through the chute.

Forwardly of the secondary feed hopper 44 the screw cylinder 38 is provided with spaced cooling jackets 50 and fluid supply lines 52 which are connected to a source of cooling fluid through a flexible conduit 54. Electrically operated heating elements 53 are mounted around the periphery of the cylinder 36 between the jackets 50, and thermocouple heads 55 are provided for measuring the temperature of the cylinder 36. An axial bore 56 within the screw 38 and a tube 58 open at its forward end and concentric within the bore 56 form a passageway for passing cooling fluid through the screw 38. The forward end of the screw cylinder 36 is provided with a pair of horizontally-spaced injection nozzles 60 which are engageable with complementary recesses in the molds to be filled with plastic.

The screw cylinder 36 is slidably supported by a pair of diametrically opposed longitudinal flanges 61 which extend laterally from the jackets 50 into complementary recesses within two channel support members 62. The members 62 are supported in fixed position by depending legs 63 secured at their lower ends to a plate 64 which is secured to the base frame 14 by bolts 65.

The rear end of the screw cylinder 36 is provided with a small annular housing 66 within which are provided suitable bearings 68 for supporting the rear end of the screw 38. The forward half 70 of the bearing retainer is secured to the screw cylinder 36. The rear half 72 of the retainer is rotatable with the screw 38. The bearing assembly is held in position by an annular member 74 which abuts a flange 76 on the forward end of the drive shaft 32. A suitable seal 78 is retained within the annular housing 66 between the wall thereof and the annular member 74. A bellows 80 surrounds the connection between the screw 38 and the drive shaft 32 and is secured at its forward end to the annular housing 66 and at its rear end to a housing 82 which contains the splined connection 60.

As seen in FIGURES 3 and 4, the drive shaft 32 for the screw 38 is provided with outwardly and axially extending splines 84 which coact with a complementary interiorly splined sleeve 86 within the housing 82 to form the splined connection 30. The sleeve 86 is journaled in the front and rear walls of the housing 82 by means of suitable bearings 88 which are mounted in retainers 90 having grease fittings 92. Intermediate its ends the sleeve 86 is provided with a sprocket 94 over which the drive chain 26 is looped.

Rearwardly of the housing 82 for the splined connection 30 the drive shaft 32 is provided with a fixed housing 96 for the introduction of heating or cooling fluid into the passage formed by the tube 58 and the bore 56 of the screw 38. The housing 96 forms two longitudinally spaced annular chambers 98, 100 about the shaft 32 with leakage between the chambers and the shaft being prevented by seals 102. The shaft 32 has an axial bore 104 which communicates with the bore 56 of the screw 38 and which is provided with a sleeve 106 which is threaded at its forward end to form the connection 40 with the screw 38. The sleeve 106 is of enlarged diameter at its rear end and is provided with two longitudinally spaced radial passages 106 and 108 which extend through the shaft 32 to communicate with the chambers 98 and 100, respectively. Leakage between the passages 106 and 108 is prevented by seals 110. The tube 58 communicates with the passage 106 and the bore 104 communicates with the passage 108 so that cooling fluid admitted through an inlet opening 112 through the wall of the housing to the chamber 98 passes axially through the shaft 32 and the screw 38 and returns to an outlet opening 114 in the housing 96 which communicates with the chamber 100.

The rear end of the drive shaft 32 is threadedly connected to an annularly flanged member 116 which is retained between two longitudinally spaced bearing members 118 within a non-rotating housing 120. The rear of the housing 120 is connected by a pin 122 to a piston rod 124 which is extensible from a cylinder 126. The other end of the piston rod 124 is connected to a piston 128 within the cylinder 126. The rear end of the cylinder 126 is pivoted at 130 for rotation about a horizontal transverse axis to the upper end of a vertical support 132 which is fixed to the base frame 14. The cylinder 26 is provided with suitable connections (not shown) for the delivery of pressurized fluid thereto for positively moving the piston 128 forwardly or rearwardly.

As seen in FIGURE 5, the table portion 12 of the molding machine includes a horizontal generally circular table 134 secured by bolts 136 to a hub 138 which is rotatably mounted on a fixed vertical shaft 140 by means of spaced upper and lower roller bearings 142. The fixed shaft 140 is supported on the base frame 14 by means of a flange 144 on the shaft which rests on a collar 146 secured to the base frame 14. Four circumferentially spaced rollers 148, only one of which is illustrated, are secured by brackets 150 to the base frame 14 for engaging and supporting the lower surface of the table 134. The shaft 140 is provided with a pair of internal passages 139 and 141 for conducting fluid pressure to the controls for opening and closing the molds 13 carried by the table. Since the structure of the molds 13 and of the means for opening and closing the same are conventional and well known, no detailed description thereof is necessary.

According to the invention the drive for intermittently rotating the table 134 through an arc which sequentially aligns each of the molds 13 with the injection nozzles 60 includes a pivoted mechanical linkage having a free end which sequentially engages and rotates an index member corresponding to each of the molds 13. In the embodiment illustrated and as seen in FIGURES 1, 6 and 7, the linkage includes two interconnected links 152 and 154 mounted on the base frame 14 immediately below the table 134. Referring to FIGURES 6 and 7 it will be seen that the inner link 152 is a straight rigid arm pivoted at its inner end 156 for rotation about an axis which is transverse to the table. This is accomplished by means of a suitable pin 158 and a bracket 160 secured to the base frame 14 in spaced relation to the table shaft 140.

The outer link 154 has generally the shape of an L, the foot portion of which is slotted at 161 to receive the outer end of the link 152. A pin 162 pivots the outer end of the link 152 within the slot in such a position that the back 164 of the slot 160 serves as a stop to limit the rotation of the outer link 154 in a counterclockwise direction about the pin 162 as seen in FIGURE 7. The outer end of the outer link 154 is provided with an arcuate recess 166 for engagement with the periphery of any of a plurality of index pins 168 which are secured to the lower surface of the table 134 in the same circumferentially spaced relationship as are the molds 13 on the upper surface of the table. As seen in FIGURE 5, each pin 168 has a portion 170 of reduced diameter intermediate its ends for receiving the recessed end 166 of the outer link 154.

The drive for the links 152, 154 includes a double acting ram 172 and a piston and cylinder dash pot 174, both pivoted at one end to the base frame 14. As seen in FIGURE 7, a bracket 176 is secured to the base frame 14 near the periphery of the table 134 and spaced from the links 152, 154 in the direction of rotation of the table 134 and the ram 172 and dash pot 174 are pivoted to the bracket by pins 178 and 180, respectively. The ram 172 is provided with suitable pressure lines (not shown) for moving a piston 182 and its associated piston rod 184 positively in either direction. The dash pot 174 contains a hydraulic fluid and has a loosely fitting piston 186 therein which is connected with a piston rod 188.

The outer end of the ram piston rod 172 is pivoted by means of a pin 190 to the end of the foot portion of the L-shaped outer link 154 at a location which is between the pivot pins 158 and 162. The outer end of the dash pot-piston rod 188 is pivoted to the body portion of the outer link 154 at a location between the pivot pin 162 and the arcuate recess 166. As shown, the link 154 has a recess 192 in which the end of the rod 188 is secured by a pivot pin 194. By this interconnection between the link 154 and the ram 172 and the dash pot 174, extension of the ram 172 causes the links 152 and 154 to buckle and to rotate about the pivot pin 158 to the phantom line position shown in FIGURE 7. Upon contraction of the ram 172, the links 152 and 154 straighten to engage the outer recessed end 166 of the outer link with one of the index pins 168 and then rotate in an opposite direction about the pin 158 simultaneously moving the engaged index pin 168 and the table 134 through an arc about the shaft 140. An arcuate wear plate 196 is secured to the base frame 14 along the path of travel of the outer end of the inner link 152. The wear plate 196 is spaced upwardly from the base plate 14 by means of spacer plates 198 so as to provide a smooth support surface along which the pivot pin 162 slides.

As seen in FIGURES 5 and 7, the index pins 168 are also engageable by a locking mechanism which restrains the table 134 against rotation when a mold is being filled. The locking mechanism includes a latch 200 mounted on the base frame 14 for linear movement along a radius of the table 134. The outer end of the latch 200 terminates in a bifurcated portion defined by two parallel fingers 202 which are spaced apart a distance only slightly greater than the reduced diameter 170 of the index pins 168. In the extended position of the latch 200, as seen in FIGURE 7, the fingers 202 engage opposite sides of an index pin 168 and extend into a bracket 204 which is secured to the base frame 14. Conveniently, the bracket 204 may consist of two spaced plates 206 secured to the base frame 14 by bolts 208 and a cover plate 210 secured to the spaced plates by bolts 212 to form a finger-receiving recess.

The inner end of the latch 200 has a laterally extending flange 214 the edges of which are slidably retained in a bracket 216. As shown, the bracket 216 consists of two spaced plates 218 which with two top plates 220 form a flange-retaining groove.

For moving the latch member 200 a double acting ram 222 is located radially inwardly from the bracket 216. The rear end of the ram 222 is pivoted for rotation about a horizontal axis by a pin 224 and support bracket 226 which is secured to the base frame 14. The ram contains a piston 228 having a piston rod 230 which is threaded into the rear end of the latch 200 and retained therein by a nut 232. The ram 222 is also provided with suitable pressure lines (not shown) for driving the piston 228 in either direction.

According to another feature of the invention the molding machine is provided with a control system in which the filling of a mold with plastic generates at the mold a control signal which is transmitted to a detector spaced from the table 134 without the use of slip rings or the like for conducting electric current to or from the table 134. This may be accomplished by providing an electric light bulb 234 corresponding to each mold 13 and by mounting the bulbs 234 and a battery 236 on the table 134 together with a suitable circuit.

As illustrated schematically in FIGURE 5, each mold 13 is provided with a pin 238 which is extensible therefrom by the plastic which is injected under pressure from the injection nozzles 60. A microswitch 240 is mounted in any convenient manner to the table 134 or to the mold so as to be closed by the outward movement of the pin 238 and thus complete the circuit to cause the bulb 234 to light. In practice, of course, the recess for the pin 238 will be provided with suitable seals for preventing leakage of plastic and with a biasing spring for returning the pin 278 to a position in which the microswitch 240 is open. As already indicated, one bulb 234 is associated with each mold 13 but the associated bulb need not necessarily be positioned adjacent its mold.

The light from an activated bulb 234 travels to a single stationary photoelectric cell 242 (FIGURE 1) which is mounted on one of the support legs 63 of the injection head 28. As seen schematically in FIGURE 8, when the cell 242 is activated it transmits a weak electrical signal to a main control circuit 244 where a sensing relay initiates automatic sequential operation of the drive motor 20 and solenoid 4-way valves 246, 248 and 250 for controlling the operation of the rotary table ram 172, the injection head ram 34 and the latching ram 222, respectively.

The main control circuit 244 includes the usual time delay relays, pilot lights, interlocks and manual starting switches which are conventionally used in electrical control circuits and no detailed description thereof is necessary. Similarly, additional conventional control elements such as limit switches associated with the injection head 28, the latch element 200 and the rams 172, 34 and 222 are not described. The solenoid valves 246, 248 and 250 in combination with a pressure source, such as compressed air or a hydraulic pump, are also conventional.

In operation of the machine, either automatically or manually, the plastic material to be molded is placed in the primary hopper 46 and is fed through the chute 48 into the secondary hopper 44 from which it is delivered into the screw housing 36. The chute fits loosely in an aperture in the secondary hopper 44 so that the latter which is secured to the injection head 28 may move toward and away from the table 134. Assuming that the injection head is in a full-forward position, the heating elements 53 are energized to soften the plastic material so that the action of the screw forces the same under high pressure out of the nozzles 60 into one of the molds 13.

As the mold 13 becomes filled, the pressure of the plastic on the inner end of the pin 238 forces it outwardly against the microswitch 240 which then closes to light the bulb 234 corresponding to that mold. If the machine is being operated automatically, the photoelectric cell 242, when activated by the lighted bulb 234, initiates operation of the main control circuit 244 to stop or substantially reduce the r.p.m. of the injection screw 38 by controlling the operation of the clutch 24. Simultaneously, or after a short interval of time, the control circuit 244 activates the valve 248 to retract the injection head ram 34 and thereby move the injection head 28 away from the table 134.

At this point the outer end 166 of the drive linkage 152, 154 for the rotary table 134 is in engagement with an index pin 168. Upon activation of the photoelectric cell 242 the main control circuit 244 through a time delay relay operates the valve 246 to retract the table ram 172 to cause rotation of the linkage 152, 154 about the pivot pin 158 in a clockwise direction as viewed in FIGURE 5. At the end of the inward stroke of the piston rod 182, as established for example by a limit switch secured to the base frame 14 and engageable by the arm 152, the table ram 172 is deactivated and the latching ram 222 and the latch element 200 are extended by operation of the valve 250. The above-described action of the linkage 152, 154 on the index pin 168 will have rotated the table 134 through an arc which brings a fresh unfilled mold into alignment with the injection head 28 and which brings one of the index pins 168 into alignment with the latch element 200.

Upon locking of the index pin 168 by the latch element 200, the latching ram 222 is deactivated through its valve 250, as by a limit switch actuated by the latch element 200, and the injection head ram 34 is extended to move the injection head 28 into engagement with the empty mold 13. A limit switch operated by the injection head 38 or the piston rod 124 near its fully extended position may be used to increase the r.p.m. of the screw 28 through control of the clutch 24. If desired, a time delay relay may be activated by the limit switch to anticipate the mold-filling time and reduce the r.p.m of the screw 28 before the mold 13 is actually filled. Extension of the injection head ram 34 may be stopped on operation of another limit switch by the injection head 38.

As the mold 13 is being filled, the valve 246 is operated, as by operation of the limit switch which indicates the fully extended position of the latch element 200 to extend the table ram 172 to the solid line position shown in FIGURE 5. The dash pot 174 offers resistance to the rotation of the linkage 152, 154 about the pivot pin 158 and as a result the linkage buckles, the outer link 154 rotating clockwise about the pivot pin 162 as viewed in FIGURE 5 while both inner and outer links 152, 154 rotate counterclockwise about the pin 158.

At the end of the outward stroke of the piston rod 184, the valve 246 is again operated, as by another limit switch engageable by the link 152, to retract the piston rod 184 and the link 152 about one quarter of its total path. Since the dash pot 174 again resists movement of link 154, the retracting force of the piston rod 184 straightens the linkage by rotating link 154 counterclockwise about the pivot pin 162 as viewed in FIGURE 5. The two links 152 and 154 are simultaneously rotated slightly clockwise about the pivot pin 158 with the result that the recessed end 166 of the linkage engages the next index pin 168. Conveniently, the rotation of the linkage to this position can be stopped by means of a limit switch which operates the valve 296 and which also operates the valve 248 to retract, or unlatch, the latch element 200.

By this time the mold 13 has been substantially filled and the r.p.m. of the injection screw has been reduced by the action of the time delay relay which was actuated when the mold-filling operation was begun. When the mold 13 becomes completely filled its pin 238 operates the corresponding microswitch 240 and bulb 234 and the above-described sequence is repeated.

It will be understood that each mold 13, after it has been filled, will be allowed to cool during part of the travel of the table 134 and will then be emptied, cleaned and otherwise readied to receive a new charge of plastic. In practice, a mold may be allowed to cool for one-half of one revolution of the table 134 and during the remainder of the revolution the same mold may be emptied and cleaned. Also, during this latter period the mold may have inserted therein any elements, such as a shoe insole around which the plastic is to be injected.

It has been found that a molding machine constructed in accordance with the principles of the present invention possesses a number of advantages in the stability, accuracy and life of the machine. It has been found, for example, that the linearly movable injection head in combination with a linearly fixed, rotatable table which can be accurately aligned with the head and positively locked in position results in less wear on the molds and the injection nozzle plus a more positive seal between the two. The hydraulically operated table drive linkage is simple and economical in construction yet is effective in accurately and positively aligning the molds with the injection head. The construction of the rotatable table is further simplified in that the positive acting arrangement for generating a control signal from a filled mold does not require any electrical connection between the table and the base frame.

While a specific embodiment of a molding machine has been described and illustrated, modifications within the scope of the invention will occur to those skilled in the art, and it is not intended that the disclosed details be limiting except as they appear in the appended claims.

We claim:

1. A molding machine comprising: an injection head having a discharge opening; a screw within said injection head for feeding plastic outwardly through said discharge opening; means mounting said screw against axial movement relative to said injection head; means mounting said injection head for reciprocal movement in the direction of the axis of said discharge opening and against lateral movement relative to said axis; a stationary motor; a first rotatable member rotatably driven by said motor and fixed against linear movement and a second rotatable member slidably engaging said first rotatable member for movement parallel to the axis of said screw and rotatably driven by said first rotatable member, said screw being secured to said second rotatable member; a mold having an inlet opening in alignment with said discharge opening; and means mounting said mold against axial movement relative to said injection head.

2. A molding machine as in claim 1 wherein said means mounting said injection head for reciprocal movement includes a hydraulic ram and connecting means between said ram and said screw operable to transmit extension and contraction of said ram into reciprocating movement of said injection head, said connecting means including bearing means permitting said screw to rotate relative to said ram.

3. A molding machine as in claim 2 wherein said hydraulic ram includes a cylinder, a piston and a non-rotating piston rod secured at one end to said piston and wherein said connecting means includes a non-rotating housing secured to the other end of said piston rod, said bearing means being carried within said housing.

4. A molding machine as in claim 1 wherein said screw includes longitudinally extending internal passages for conducting a heat exchange fluid and wherein said machine further includes fluid connection means associated with said screw for supplying a stream of heat exchange fluid through said passages.

5. A molding machine as in claim 4 wherein said fluid connection means includes a non-rotating member slidably engaging an extension on said screw, said non-rotating member and said extension having passages in communication with each other, the passages in said extension also communicating with the passages in said screw.

6. A molding machine as in claim 1 wherein said injection head includes a barrel enclosing said screw, wherein said mounting means for said injection head includes rail means supporting said barrel for linear reciprocating motion, and wherein said second rotatable member includes an extension provided on said screw and projecting from said barrel into said second rotatable member, said first and second rotatable members having intermeshing splines thereon.

7. A molding machine as in claim 6 wherein said screw and said screw extension include longitudinally extending internal passages for conducting a heat exchange fluid, said machine further including non-rotating fluid connecting means associated with said screw extension for supplying a stream of heat exchange fluid through said passages.

References Cited
UNITED STATES PATENTS

| | | | |
|---|---|---|---|
| 2,629,132 | 2/1953 | Willcox et al. | 18—30 |
| 3,109,200 | 11/1963 | Ludwig | 18—30 |
| 3,133,316 | 5/1964 | Arpajian | 18—30 |
| 3,134,137 | 5/1964 | Immel | 18—20 X |
| 3,146,287 | 8/1964 | Kleine-Albers | 18—30 |

J. SPENCER OVERHOLSER, *Primary Examiner.*

WILBUR L. McBAY, *Examiner.*